Feb. 29, 1944.    K. RATH    2,343,206
CAMERA WITH AUTOMATIC EXPOSURE CONTROL
Filed June 10, 1942    3 Sheets-Sheet 1

INVENTOR.

Feb. 29, 1944. K. RATH 2,343,206
CAMERA WITH AUTOMATIC EXPOSURE CONTROL
Filed June 10, 1942 3 Sheets-Sheet 3

INVENTOR.

Patented Feb. 29, 1944

2,343,206

UNITED STATES PATENT OFFICE 2,343,206

CAMERA WITH AUTOMATIC EXPOSURE CONTROL

Karl Rath, New York, N. Y.

Application June 10, 1942, Serial No. 446,409

16 Claims. (Cl. 95—10)

My invention relates to automatic exposure control for photographic cameras, more particularly to control systems utilizing a photoelectric cell, preferably a photovoltaic or self-generating cell as a means for measuring the scene or object brightness and determination of the proper adjustment of the exposure control organs of the camera to secure a correctly exposed photograph.

Automatic exposure control systems at present known may be divided into three general categories viz. first, the direct, motive type as exemplified by U. S. Patent 2,100,672, wherein the current supplied by the photoelectric cell having an intensity varying in proportion to the scene or object brightness operates a small electric motor or other actuator (galvanometer) which in turn serves to directly adjust a suitable light regulator or diming device such as the iris diaphragm associated with the camera lens or objective. Devices of this type are either bulky and heavy or of extremely delicate construction so as to practically exclude their use in small portable cameras especially those for use by amateurs or less experienced persons for which automatic control is most desirable; second, the direct, limiting or abutment type of exposure control as exemplified by U. S. Patent Re. 21,034, wherein the movable element or needle of the current measuring instrument energized by the photoelectric cell serves as a variable stop or abutment determining the adjustment of an exposure control organ preferably the lens iris diaphragm, the operation of the latter being carried out manually by the photographer and being preferably synchronized with the shutter release for effecting the exposure. Devices of this character, while operating fully automatically are disadvantageous from a mechanical point of view in that elaborate entrapping and other mechanical elements are required to prevent damage to the delicate and sensitive instrument excited by the weak photoelectric currents; and third, the indirect, compensating type of exposure control as exemplified by U. S. Patent 2,031,321, wherein a compensating device is provided such as a variable electric resistance inserted in the photoelectric circuit or a light dimming element placed in front of the sensitive surface of the photocell to reduce the current to a predetermined including zero value. The extent of adjustment of the compensating device is a measure of the object brightness and is utilized to control an exposure control organ (lens aperture, exposure time) by direct physical coupling with the latter. Devices of this type, while being substantially free from the drawbacks of the motive and limiting type, present great difficulties if it is desired to consider additional exposure determining factors such as emulsion speed and exposure time, assuming the compensating device to be coupled with the lens aperture or iris control.

Accordingly, it is an object of the invention to provide an automatic exposure control system which is both mechanically simple and rugged and which enables all the essential variables (exposure time, lens aperture and emulsion speed) to be chosen within the effective operating range to suit any existing picture taking conditions or requirements.

Another object is to provide an automatic exposure control system designed for a predetermined range of operating conditions to take care of the majority of cases such as the average outdoor scene while enabling a manual exposure determination under conditions outside the automatically controlled or operating range.

A further object is to provide an exposure control system wherein all adjustments for additional controlling factors (emulsion speed, etc.) are of a purely mechanical nature, thereby eliminating any changes in the constants of the photoelectric circuit and maintaining the system at a maximum of sensivity and efficiency.

Other objects and advantages of the invention will be discussed or become apparent as the following description proceeds taken in reference to the accompanying drawings forming part of this specification and wherein:

Like reference characters identify like parts through out the different views of the drawings.

Figures 1, 2:
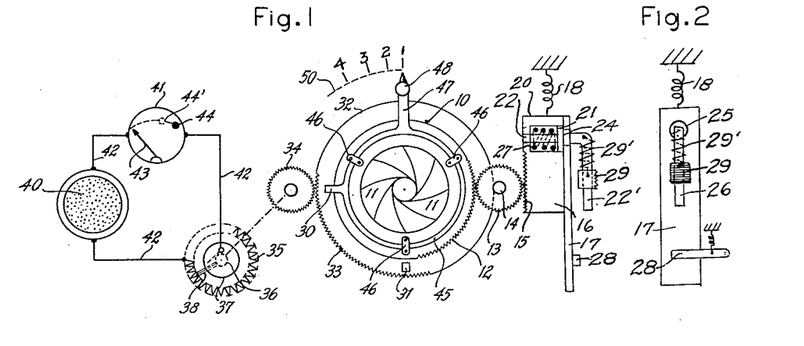
Figure 1 is a diagrammatic representation of an automatic exposure control system embodying the principles of the invention.
Figure 2 is a side view of one of the parts of Figure 1.

Referring to Figures 1 and 2, I have shown an automatic iris control arrangement especially designed for a fixed exposure time and varying emulsion speeds, and suitable for motion picture cameras having a standard frame number (usually 16 per/sec.). The numeral 10 indicates the adjusting ring of a standard iris diaphragm having leaves or blades 11 to provide an aperture of varying diameter by rotation of the ring 10. The iris diaphragm is usually combined with the lens and shutter mechanism of the camera and serves to vary the amount of light passed by the lens to the sensitive film or plate. Since the exposure is roughly proportional to the product of the illumination at the focal plane of the camera and the exposure time during which the shutter is open, adjustment of the iris diaphragm to a proper value as determined by the existing object or scene brightness will result in a correctly exposed photograph.

According to the embodiment shown, the diaphragm is normally urged into its fully closed position as shown in the drawings and adjusted to its proper aperture just prior to effecting an exposure. This is accomplished by coupling the adjusting ring 10 with the release knob or lever of the camera, whereby operation of the latter will at first result in operation of the diaphragm to a definite aperture determined by an adjustable stop or abutment element previously set according to the existing brightness of an object or scene to be photographed, whereupon release of the shutter will be effected.

In the drawings, the iris adjusting ring is provided with a partially or completely toothed peripheral edge as shown at 12 meshing with an intermediate gear 13 mounted upon a shaft 14 and in turn engaging a rack 15 of a release element 16. The latter is slidably mounted upon a guide plate 17 and normally urged into its uppermost position by means of a spring 18. Element 16 is locked in its upper position shown in any suitable manner and may be unlocked for moving it in the downward direction for operating the diaphragm 10 and effecting the shutter release. For this purpose, element 16 has a cylindrical recess 20 near its upper end, said recess serving to receive a plate or disc 21 slidable therein and mounted upon a shaft 22 passing through guide plate 17. Shaft 22 has an enlarged portion 24 fitting in the enlarged upper part 25 of a guide slot 26 in the plate 17. A coiled spring 27 or the like arranged within recess 20 normally urges disc 21 against plate 17, thereby maintaining element 16 in its locked position. By pressing shaft 22 against plate 17 and compressing spring 27, the outer narrower part of shaft 22 will be aligned with the slot, thus allowing element 16 to be moved in the downward direction against the action of spring 18. The extending end of shaft 22 is provided with a release knob yieldingly connected thereto in any suitable manner to synchronize the adjustment of the iris diaphragm 10 with the shutter release operation in a manner well-known in the art of abutment type control systems referred to hereinabove.

In the example illustrated, shaft 22 is provided for this purpose with a transverse extension 22' slidingly supporting a release knob 29, the latter being further connected to said extension through a yielding coupling such as a coil spring 29' as shown in the drawings. Upon unlocking the release knob 29 by pressing it and in turn shaft 22 against plate 17, the knob may be moved at first against the action of spring 18 which exerts a lesser resilient force than spring 29', whereupon, after setting of the diaphragm 10 to the proper aperture when stop 30 engages stop 31, the movement of knob 29 may be continued against the action of spring 29' until engaging a suitable shutter release or tripping element 28 for initiating the exposure.

In order to limit the diaphragm adjustment when reaching the proper aperture, adjusting ring 10 is provided with a stop or projection 30 arranged to engage a further adjustable stop 31 carried by an adjusting ring or disc 32. Stop 31 is set to different positions according to the object or scene brightness, thereby determining the proper lens aperture opening. For this purpose, disc 32 has an outer edge formed partly or entirely with gear teeth 33 arranged to mesh with an intermediate gear 34, the latter being coupled with or directly mounted upon the shaft of an adjustable compensating resistance 35 or equivalent device as indicated by the dot and dash line in the drawings. Resistance 35 being advantageously of the well known wire wound rotary type has a shaft 36 carrying an adjusting knob 37 and a brush or sliding element 38 in contacting engagement with the resistance wire turns.

A photoelectric cell 40, preferably of the self-generating or photo-voltaic type is connected in series with resistance 35 and an electric indicating instrument 41 through suitable connecting leads 42 to form a closed electric circuit. Instrument 41 which may be a standard microammeter has an indicating pointer or needle 43 shown in the fully deflected position and moving over a dial having applied thereto an index or adjusting mark 44.

The operation of the system aforedescribed is as follows:

With the photocell 40 positioned so as to face the scene or object to be photographed, it will generate an electric current having an intensity proportional to the scene brightness or the light rays exciting the sensitive surface of the cell. As a result, a torque will be exerted upon pointer 43 resulting in a deflection from the zero position.

Assuming the amount of resistance connected in the photoelectric cell circuit to be zero or a minimum as shown in the drawings, pointer 43 will be deflected to a position determined by the existing scene brightness. This deflection is reduced, by operating the compensating resistance to a predetermined value by rotating the control knob 37 until the pointer 43 coincides with the index or mark 44, whereby the amount of resistance or extent of rotation required to reduce or compensate the pointer deflection will be a measure of the existing scene brightness.

The rotation of the compensating resistance is transmitted to the adjusting member 32 of stop 31 in any suitable manner such as by way of an intermediate gear 34 mounted upon the shaft 36 of the rotary resistor 35 and meshing with the teeth of member 32. In the position shown in the drawings, the maximum deflection of pointer 43 corresponds to the highest scene brightness to be dealt with and will require a substantial rotation of the resistor to insert sufficient resistance in the electrical circuit so as to reduce the current to the predetermined value determined by the index or mark 44. This will result in the ring 32 being rotated in a clockwise direction, whereby stop 31 approaches stop 30, limiting thereby the size of the aperture to which the iris will be operated in the manner described by the subsequent operation of the release knob 29. The design of the resistance 35 and/or the coupling elements (change of resistance as a function of angular rotation) is so chosen that the control of stop 31 as a function of the object or scene brightness will be such as to cause a proportional variation of the amount of light passing through the lens to insure a correctly exposed picture under any existing conditions of scene brightness and for a predetermined exposure time and emulsion speed.

In order to adapt the arrangement aforedescribed to different emulsion speeds, according to a further feature of the invention, stop 30 of the diaphragm adjusting member 10 is also made adjustable relative to the latter such as by mounting it upon or constructing it integrally with a ring shaped carrier 45 arranged to frictionally engage an annular groove in member 10 such as by the provision of resilient retaining brackets or bridges 46 or in any other suitable manner. Ring 45 has a radial extension or adjusting lever 47 provided with an adjusting knob 48 arranged to move along a fixed scale of emulsion speeds 50 marked 1, 2, 3, 4 in the drawings. Numeral 1 corresponds to the lowest emulsion speed for which stop 30 is in the uppermost position as shown. If the next higher speed is used requiring a halving of the exposure and identified by numeral 2, lever 47 is rotated in anti-clockwise direction until the pointer of knob 48 is opposite the emulsion speed number 2. This results in the stop 30 approaching stop 31 and in turn limiting of the aperture opening of the iris by subsequent operation of the release button 29. The locking of the latter in the uppermost or zero position in the manner described makes it possible to rotate ring 45 against the friction with member 10 which friction, as is understood, should have a greater value than the force exerted by stop 30 upon stop 31 at the end of the diaphragm adjusting operation.

If higher emulsion speeds are used, the initial distance between stops 30 and 31 is reduced accordingly so as to result in a correspondingly decreased diaphragm aperture adjustment. One of the main advantages of the exposure control system described is due to the fact that no adjustment or variation of the electro-optical characteristics of the photocell circuit are required, whereby not only the full response and sensitivity are available under all conditions, but the operating characteristics of the circuit may be designed independently of the exposure control and maintained constant and independent of all other exposure controlling factors such as emulsion speed, exposure time (see Figure 3), etc. This is of special importance in case of barrier layer type photovoltaic or self-generating photocells, at present exclusively used for photographic hand cameras, the short circuit current of which is directly proportional to the total light flux incident upon the sensitive surface of the cell and is independent of the area illuminated. The introduction of external resistance as used in many of the prior art arrangements to consider additional exposure controlling factors destroys the linearity between current and flux and greatly reduces the sensitivity.

Furthermore, since the correct position of the compensating device or stop 31 is indicated by a null reading, the galvanometer serves merely as a current detector. Its exact sensitivity is not important and accordingly its bulk and size may be held at a minimum, thus fulfilling an important requirement for portable cameras.

Figure 3:
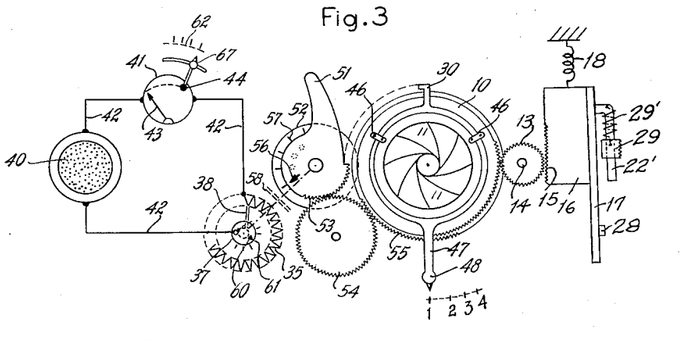
Figure 3 is a diagram showing a modification of Figure 1.
Figure 4:
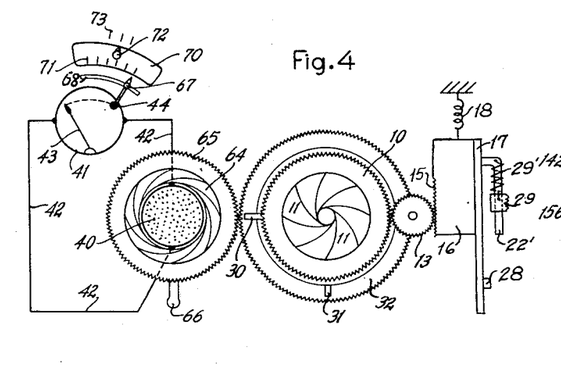
Figures 4, 5 and 5A illustrate further embodiments of the invention.
Figure 5:
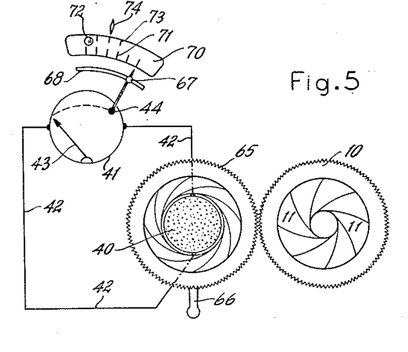

As pointed out above, the arrangement shown in Figure 1 is especially designed for a constant shutter speed or frame number in case of motion picture cameras. If variable exposure times or frame numbers are desired the index or scale mark 44 of the instrument 41 may be displaced relative to the pointer 43 as shown in Figures 3, 4 and 5 or a plurality of suitably spaced indices 44, 44', etc., may be provided each coordinated to a different exposure time or frame number. Alternatively, member 47 may serve for adjusting the exposure time according to a scale 50 and the emulsion speed may be considered by adjusting or varying the position of index 44.

In Figure 3, I have shown another modification of an exposure control system embodying the principles of the invention and utilizing purely mechanical means for considering both exposure time and emulsion speed with automatic adjustment of the diaphragm aperture in accordance with the scene or object brightness. In the exemplification shown, member 32 takes the form of an adjustable cam 51 coupled with the compensating resistor 35 and serving as a variable stop or abutment for the projection or nose 30 of the iris diaphragm adjusting member 10.

Cam 51 is furthermore adjustable in its initial or starting position in accordance with a varying exposure time or frame number. For this purpose, the cam is loosely mounted upon a shaft or stud of a disc 52 coupled with resistor 35 and resiliently urged against and locked with respect to the latter by the provision of suitable spring means (not shown) and a projecting pin of one member engaging one of a series of perforations in the other member. Cam 51 is furthermore provided with a toothed portion 53 arranged to mesh with an intermediate gear 54 when the cam is lifted and unlocked from the disc 52, said intermediate gear engaging in turn the exposure time adjusting element 55 forming part of the shutter of the camera.

In the position shown, the adjustment corresponds to the shortest exposure time provided by the automatic control range. If a greater exposure time is desired, cam 51 is lifted or disengaged from disc 52 so as to come into meshing relation with gear 54 and time adjusting control element 55. In this position, the cam may be rotated anti-clockwise relative to the disc 52 until index 56 is opposite to a chosen higher exposure time of scale 57 applied to disc 52. This will result in a shortening of the distance between the cam 51 and nose 30 and accordingly a smaller aperture adjustment as should be the case inasmuch as a greater exposure time is used.

The arrangement is advantageously designed in such a manner that, for the slowest emulsion speed and shortest exposure time adjustment, the diaphragm will be opened to its full aperture in case of the minimum object brightness for which the system is designed to operate automatically, and that when using the fastest emulsion speed and longest exposure time the aperture will be at a minimum for maximum scene or object brightness. The operating range between maximum and minimum object brightness may be suitably chosen to cover the majority of picture taking conditions such as those prevailing for the average outdoor scene including sunny sky, lightly and heavily clouded sky, deep shadows and ordinary indoor scenes. If the index or adjusting mark of the instrument is properly chosen to correspond to a predetermined current generated by the photoelectric cell, abnormal conditions falling outside the automatic operating range will be instantly indicated to the photographer by the fact that the initial pointer deflection, with the compensating resistance in the zero or minimum position, will remain below the index mark (object brightness less than minimum covered by the automatic operating range), or that with full compensation i. e. with the compensating resistance completely inserted in the circuit the pointer will remain above the index mark (object brightness above the maximum value covered by the automatic range). In either case therefore it will be impossible to cause the pointer to coincide with the index mark, indicating thereby that the light conditions are outside the range covered by the automatic control.

In the latter case either the exposure time has to be varied or the automatic operation suspended by decoupling resistance 35 from the adjustable stop or cam such as by disengaging a suitable coupling indicated at 58 in Figure 3. In this decoupled condition, the light meter may be used independently by providing adjusting knob 37 of the resistance 35 with an index 60 arranged to move along a stationary scale 61 calibrated in light values or scene brightness numbers. The latter may serve for determining the proper exposure adjusting values (aperture and exposure time for a given emulsion speed) by the aid of a conversion table suitably mounted upon the camera in a manner well understood by those skilled in the art.

Alternatively, knob 37 of the compensating resistance may be physically coupled with an adjustable member of a mechanical calculator of any suitable design known in the art. In either case the light meter may be used independently of the automatic adjusting mechanism by operating resistance 35 to a value so as to cause pointer 43 to coincide with the index 44 in the manner described. If desired, index 44 may be made adjustable by mounting it upon a movable knob 67 in accordance with a further scale 62 calibrated in emulsion speeds or any other exposure controlling factor.

The independent as well as automatic operation of the light meter constitutes one of the advantages of the invention and is made possible by the complete separation of the electrical circuit and independence of its characteristics of the exposure control except for the coupling of the compensating resistance or equivalent device.

There is thus provided in Figure 3 an arrangement for considering both exposure time and emulsion speed without any change of the constants of the photoelectric circuit, by adjusting the initial relative position or distance between a pair of stop members, which distance determines the aperture adjustment effected by the shutter release.

The reduction or compensation of the photoelectric current generated by the photoelectric cell in accordance with the scene brightness may be effected by any suitable light reducing or dimming device arranged in front of the sensitive surface of the cell such as a photometric wedge or a second iris diaphragm 64 having a toothed operating ring as shown in Figure 4 the extent of rotation of which required to cause pointer 43 to coincide with the index 44 will be a measure of the object brightness in substantially the same manner as in the arrangement described utilizing a variable resistance in the photocell circuit. In Figure 4, the diaphragm adjusting ring 65 having an operating lever 66 meshes with ring 32 carrying stop 31 which latter cooperates with stop 30 of the iris adjusting member in substantially the same manner to that described in connection with Figures 1 and 2. In the present embodiment, stop 30 is rigid with the diaphragm adjusting ring 10 and the various emulsion speeds as well as exposure times are taken into account by a modified adjustment of the position of the index 44 of the meter 41. For this purpose, the latter is provided with a suitable adjusting knob 67 to move within a guide slot 68 and along a relatively movable scale member 70. The latter is provided with a scale 71 adjacent knob 67 preferably calibrated in exposure time values and has an adjusting knob 72 arranged to move along a stationary scale 73 calibrated in emulsion speed values.

In operation, scale member 70 is first set according a chosen emulsion speed by bringing knob 72 opposite to the proper number on scale 73 identifying the speed of the plate or film used in the camera. Thereupon, index 44 is adjusted so that adjusting knob 67 is opposite a desired exposure time number on scale 71. With the camera held in proper position so that the photocell 40 is illuminated by light rays emanating from the scene or object to be photographed, adjustment of diaphragm 65 by the aid of operating lever 66 to a point where the pointer 43 is aligned with the index will result in an automatic setting of the lens diaphragm stop 31 to cause operation of the diaphragm to a proper aperture in accordance with an existing object brightness by subsequent operation of the shutter release knob 29 in the manner understood from the foregoing.

The operation of the diaphragm 10 in Figures 3 and 4 in conjunction with the shutter release may be substantially the same as shown in Figures 1 and 2 and a similar control arrangement identified by like reference numbers has been shown in the drawings.

The use of an adjustable scale arrangement associated with the index 40 of a compensating type indicating instrument is not limited to the specific aperture control utilizing an adjustable stop as shown in Figure 4, but may be used in connection with any other type of aperture adjustment such as a direct coupling of the compensating device (iris 65 or compensating resistance 35) with the diaphragm adjusting element 10. An arrangement of the latter type is shown in Figure 5 which differs from Figure 4 by the direct coupling of the compensating diaphragm 65 with the lens diaphragm 10, whereby adjustment of the former to cause pointer 43 to coincide with mark 44 will result in the proper lens aperture adjustment for an existing object brightness. Diaphragm 65 may be replaced by a compensating resistance directly coupled with diaphragm 10 as is understood. The scale arrangement in Figure 5 also differs somewhat from of Figure 4 in that both exposure time and emulsion speed scales 71 and 73, respectively, are arranged on adjustable member 70 having an operating knob 72, a further stationary index 74 being arranged for cooperating with emulsion speed scale 73.

Figure 5A:
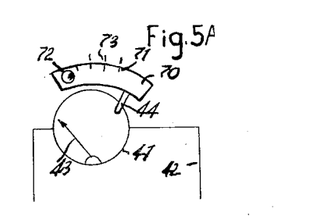

Figure 5A shows a simplified arrangement of the index mark and associated adjustable exposure time and emulsion speed scales. In this modification, index 44 is rigid with scale member 70 carrying a scale 71 which may be calibrated in exposure times and arranged to move along a stationary scale 73 calibrated in emulsion speed values, though the scales may be interchanged as is readily understood. In use, scale member 70 is set by the aid of knob 72 so that a desired exposure time on scale 71 is opposite the emulsion speed number on scale 73, whereby the index 44 will be in a proper relative position to the pointer 43 to cause the proper aperture adjustment by subsequent compensation of the photoelectric current and operation of the shutter release in the manner described.

Figure 6:
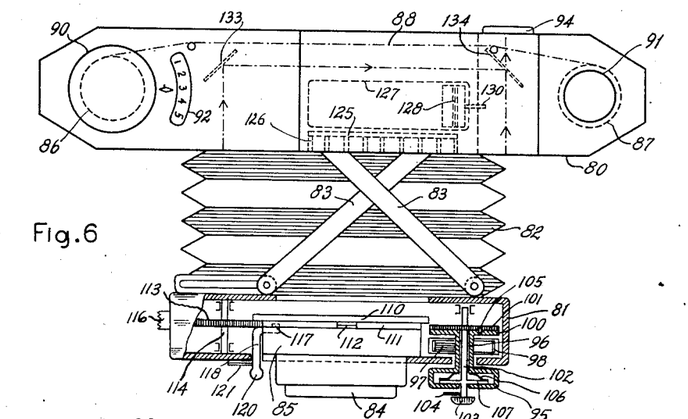
Figures 6 and 7 are top and front views, respectively, shown partly in section of a collapsible bellows type camera embodying an automatic exposure control arrangement according to the invention.
Figure 7:
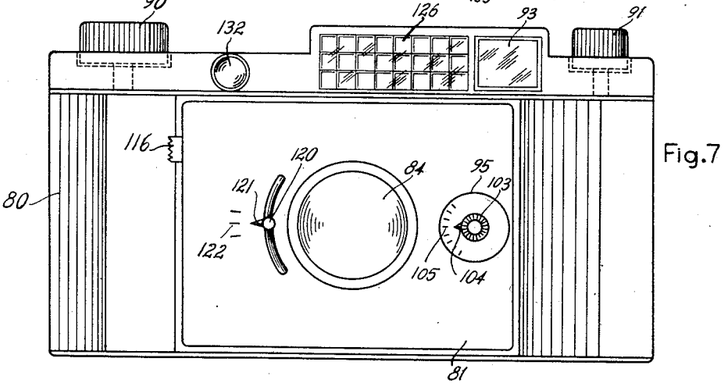
Figure 8:
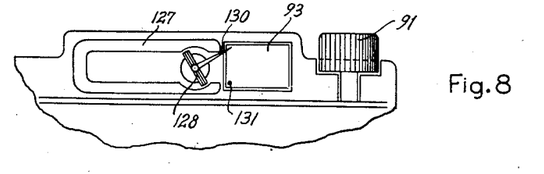
Figure 8 is a fragmental view of Figure 7 with the front broken away.

Referring to Figures 6, 7 and 8, I have illustrated by way of example a structural embodiment of an automatic exposure control of the type shown in Figure 3 in a photographic camera of the well-known collapsible bellows type. The camera shown comprises a body 80 supporting the photoelectric cell and indicating instrument, a flat rectangular lens and shutter casing 81 containing the automatic control organs and a collapsible bellows 82 connecting body 80 with said casing by means of a suitable linkage mechanism such as lazy tongs 83 or any other equivalent arrangement known in the art. Items 84 and 85 indicate the lens and shutter, respectively, of known construction, 86 and 87 are the supply and take-up spools for the film 88 arranged to be drawn past the picture gate in the focal plane of the lens by means of winding and re-winding knobs 90 and 91 mounted on the top of the camera body, while numeral 92 represents the viewing window of an exposure counter of any suitable type shown in the art and 93 is an eye level view finder mounted on the top of the body 80 and having a viewing window 94. Other details well known to those skilled have been omitted in the drawings inasmuch as they are unnecessary for the understanding of the invention.

Numeral 95 represents the adjusting knob for the compensating resistance corresponding to item 35 of Figure 3 and having a hollow shaft 96 journaled in the front wall of casing 81 adjacent to the shutter 85, said shaft carrying the sliding contact 97 of the rotary compensating resistance 98. Shaft 96 terminates in a disc 100 corresponding to item 52 of Figure 3.

Numeral 101 represents a cam corresponding to item 51 of Figure 3 and having a shaft 102 passing through hollow shaft 96 and extending beyond knob 95. The projecting end of said shaft is provided with a knob 103 having a pointer 104 arranged to cooperate with a scale 105 of exposure times applied to knob 95 as more clearly shown in Figure 7. Members 100 and 101 are relatively adjustably locked by a pin or the like 105 of either engaging one of a series of depressions of the other and a spring 106 urging the cam 101 against the disc 100. For the latter purpose, shaft 102 has a flange 107 arranged within knob 95, said flange being urged against the inside of said knob to retain members 100 and 101 in locking engagement. If it is desired to adjust 101 relative to disc 100 or knob 95 to consider various exposure times in the manner described in connection with Figure 3, knob 103 is pressed against knob 95 thereby unlocking cam 101 and allowing its rotation to cause pin 105 to engage another depression in member 100 when index 104 is opposite the desired new exposure time indicated on scale 105 after release of knob 103. Furthermore, when the latter is repressed, the lower circular and toothed part of cam 101 will engage the time adjusting ring 110 of the shutter 85 (corresponding to item 55 of Figure 3), whereby a single adjustment will result in both the shutter setting and adjustment of the exposure control.

Item 111 is the iris control ring having a projection or nose 112 cooperating with cam 101, ring 111 being arranged to mesh with gear 113 mounted upon a shaft 114 and cooperating with the shutter release element having a button 116, all the afore-said elements substantially corresponding to and functioning in the manner of the equivalent elements 10, 30, 51, 14, 13 and 29, respectively, of Figure 3. Further details such as the locking arrangement for the release knob 116 and the yielding coupling connection between said knob and the diaphragm adjusting member may be substantially the same as shown in Figures 1 to 4 and suitably mounted within the shutter casing 81 with only the knob 116 projecting from the casing in the manner shown. Nose 112 is adjustable relative to member 110 by forming a part of friction ring 117 having an adjusting lever 118 corresponding to item 47 of Figure 3, and projecting through an opening in the front wall of casing 81 and provided with an adjusting knob 120 and index 121. The latter moves along a scale of emulsion speed numbers 122 to enable the use of different types of films or plates in the manner described with reference to Figure 3.

The photoelectric cell 125 which may be of any known type, preferably a barrier layer selenium or cuprous oxide photovoltaic cell is advantageously mounted on the top of the body 80 behind a suitable light baffle 126 of the cellular or any other type to limit its response or acceptance angle to correspond with the view angle of the camera lens 84 and finder 93. The indicating instrument is also mounted on the top of the camera body directly behind the photocell and comprises a permanent magnet 127 (see Figure 8) and a rotatable winding 128 carrying an indicating pointer or needle 130 which advantageously projects into the field of finder 93, the latter including a suitable index mark 131, whereby the exposure control adjustment may be carried out without removing the camera from the picture taking position. However, any other type of indicating instrument and mounting thereof may be employed, if desired.

The instrument and photocell are electrically connected with the compensating resistance 89 by suitable flexible leads (not shown) which may be hidden underneath one of the struts 83.

The arrangement shown in Figures 6 to 8 results in a most favorable utilization of space by the provision of a range finder preferably combined with the view finder 93 of the camera and comprising a window 132, adjustable reflector 133 and semitransparent reflector 134 or any equivalent arrangement known in the art.

Figure 9:
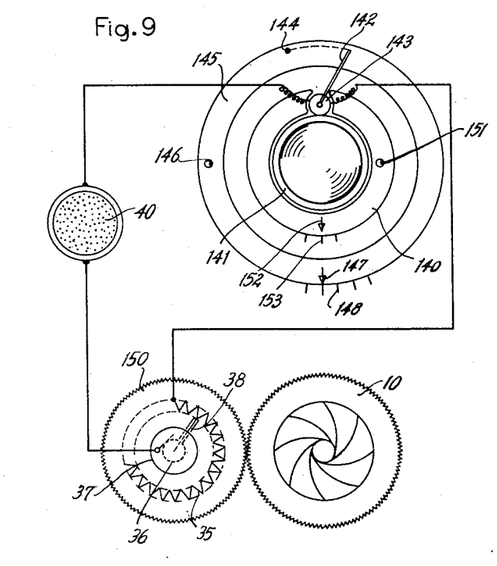
Figure 9 illustrates schematically still a further modification of an exposure control system embodying the principles of the invention.

Referring to Figure 9, I have shown a further modification of a control system of the type of Figures 4 and 5 involving the setting of a desired emulsion speed and exposure time, whereupon adjustment of the compensating device to cause the indicating pointer or needle to coincide with an index mark will result in proper adjustment of the lens aperture in accordance with the existing scene brightness and within the automatic operating range of the system.

As will be understood, since exposure time and lens aperture are coordinated to each other, their adjusting organs may be interchanged in this and the remaining exemplifications of the invention i. e. the arrangement may be such that the aperture is chosen as desired, whereupon the exposure time will be automatically determined by the operation of the compensating device. However, the adjustment of the aperture and selection of the exposure time or frame number is preferable in case of motion picture photography as well as in still photography where it is the custom to use a constant shutter speed, say 1/25 or 1/50th sec., for the majority of cases and to adjust the lens aperture according to the light conditions.

Figure 10:
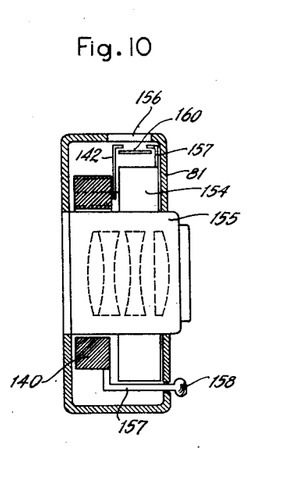
Figures 10 and 11 show in vertical cross-section and partial top view, respectively, a structural embodiment of an exposure control according to Figure 9.

In Figure 9, the magnet 140 of the indicating instrument is circular shaped and rotatably mounted upon the lens barrel 155 preferably behind the shutter casing (see Figure 10). The needle or pointer 142 carried by the movable armature 143 mounted in a suitable gap of the magnet 140, cooperates with an index 144 applied directly to the exposure time adjusting organ 145. The latter has a control knob 146 and further index 147 moving along a stationary scale 148 calibrated in exposure time values, whereby setting of a desired exposure time will result in index 144 to be initially adjusted relative to the needle 142 so as to compensate for the various exposure times in the automatic control of the diaphragm 10 by the compensating resistance 35. The latter and its connection with the photoelectric cell and indicating instrument are substantially the same as in the previous illustrations. Diaphragm 10 has been shown to be directly coupled with shaft 36 of the compensating resistance by way of a gear 150, but, as is understood, the coupling may by way of an adjustable stop or abutment or the compensation may be effected by a second diaphragm or dimming device as shown and described hereinbefore.

In order to consider various emulsion speeds, the needle 142 is also variably initially adjusted by rotating the entire instrument provided for this with an adjusting knob 151 and an index 152 carried by the magnet 140, said index being arranged to move along a further stationary scale 153 calibrated in emulsion speeds. There is thus provided an automatic exposure control system enabling variation of both exposure time and emulsion speed without any change of the constants of the photoelectric circuit.

Figure 11:
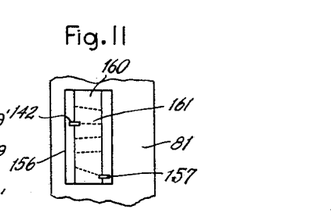

Figures 10 and 11 illustrate a structural embodiment of an exposure control as shown in Figure 9. Casing 81 housing the shutter 154 and lens barrel 155 may be similar to that shown in Figure 6. Magnet 140 is rotatably mounted upon the lens barrel 155 behind the shutter casing 154 and the needle 142 which has an outer edge bent at a right angle is visible in a window 156 in the top face of casing 81. Similarly, the exposure time adjusting member of the shutter 154 (not shown) has an extension 157 also having its outer edge bent at an angle to serve as an index also visible in the window 156 opposite to the needle 142. Magnet 140 is further provided with an adjusting lever 157 extending through the front wall of casing 81 and having an operating knob movable along an emulsion speed scale (not shown) corresponding to scale 153 of Figure 9. A fixed plate 160 arranged underneath the pointers 142 and 157 and provided with suitable guide lines or channels 161 (see Figure 11) serves to coordinate the position of needle 142 with that of the index 157 in case the instrument has non-linear relation between its deflecting angle and the energizing current.

In operation, after both initial positions of 142 and 157 have been adjusted in accordance with a selected emulsion speed and exposure time, respectively, the end of needle 142 is brought opposite to the end of the respective guide line whose other end terminates in the index 157 by operating the compensating device, whereupon the lens aperture will be automatically adjusted to its proper value in the manner that will be evident from the above.

While I have shown and described a few desirable embodiments of my invention, it is understood, that this disclosure is for the purpose of illustration and that various changes in shape, proportion and arrangement of parts as well as the substitution of equivalent elements for those herein shown and described may be made without departing from the spirit and scope of the invention as set forth in the appended claims.

I claim:

1. In exposure control apparatus for a photographic camera having adjustable exposure control means normally urged to a starting limit position, photoelectric means, current indicating means electrically connected to said photoelectric means, adjustable compensating means independent of said control means for reducing the response current of said photoelectric means to a predetermined value, and stop means independent of said indicator and in positive connection with said compensating means to limit the adjustment of said control means from its starting position.

2. In exposure control apparatus for a photographic camera having movable shutter release means and adjustable exposure control means normally urged to a starting limit position, photoelectric means, current indicating means electrically connected to said photoelectric mans, adjustable compensating means independent of said control means for reducing the response current of said photoelectric means to a predetermined value, stop means independent of said indicator and in positive connection with said compensating means, and yielding coupling means between said release means and said exposure control means to adjust said exposure control means from its starting position to a position determined by said stop means prior to effecting an exposure.

3. In exposure control apparatus for a photographic camera having shutter release means and variable iris diaphragm adjusting means normally urged to a starting limit position, a photovoltaic cell, a current indicating instrument having a pointer and fixed index mark and being electrically connected to said cell, adjustable compensating means independent of said diaphragm adjusting means for reducing the response current of said cell to a predetermined value defined by said index mark, stop means independent of said instrument and in positive connection with said compensating means, and yielding coupling means between said release means and said diaphragm adjusting means to operate said diaphragm from its starting position to an aperture determined by said stop means prior to effecting an exposure.

4. In exposure control apparatus for a photographic camera having adjustable exposure control means normally urged to a starting limit position, photoelectric means, current indicating means electrically connected to said photoelectric means, adjustable compensating means for reducing the response current of said photoelectric means to a predetermined value, cooperating stop means in positive connection with both said control means and said compensating means, respectively, and arranged to limit the adjustment of said exposure control means from its starting position, and means for varying the initial relative position between said stop means in accordance with an additional exposure controlling factor.

5. In combination with a photographic camera having an adjustable exposure control organ, a photoelectric cell, a current indicating instrument electrically connected to said cell, adjustable means for reducing the response current of said cell to a predetermined value, cooperating stop means associated with both said control organ and said adjustable means to limit the adjustment of said control organ in accordance with the position of said adjustable means, means to vary the initial position of one of said stop means in accordance with an additional exposure controlling factor, and further means to vary the initial position of the other stop means in accordance with a further exposure controlling factor.

6. In combination with a photographic camera having an adjustable iris diaphragm normally urged to a starting limit position, a photoelectric cell, a current indicating instrument electrically connected to said cell, adjustable compensating means for reducing the response current of said cell proportional the brightness of a photographic object to a predetermined value, cooperating stop means associated with both said iris diaphragm and said compensating means to limit the adjustment of said diaphragm from its starting position, means to vary the initial position of one of said stop means in accordance with varying emulsion speeds, and further means to vary the initial position of the other stop means in accordance with varying exposure times.

7. In combination with a photographic camera having an adjustable iris diaphragm normally urged to a starting limit position, a photoelectric cell, a current indicating instrument electrically connected to said cell, adjustable compensating means for reducing the response current of said cell proportional to the brightness of a photographic object to a predetermined value, cooperating stop means associated with both said iris diaphragm and said compensating means to limit the adjustment of said diaphragm from its starting position, means to vary the initial position of one of said stop means in accordance with varying emulsion speeds, exposure time control means for said camera, and further means coupled with said control means to vary the initial position of the other stop means.

8. In combination with a photographic camera having iris diaphragm adjusting means normally urged to a starting limit position, a photoelectric cell, a current indicating instrument electrically connected to said cell, adjustable compensating means for reducing the response current of said cell proportional to the brightness of a photographic object to a predetermined value, cooperating stop means associated with both said iris diaphragm adjusting means and said compensating means to limit the adjustment of said diaphragm from its starting position, means to vary the initial position of one of said stop means in accordance with varying emulsion speeds, shutter release means for said camera, and yielding coupling means between said shutter release means and said iris diaphragm adjusting means to operate said diaphragm to a position determined by said compensating means in the compensating position prior to effecting an exposure.

9. In combination with a photographic camera having iris diaphragm adjusting means normally resiliently urged to a starting limit position, a photoelectric cell, a current indicating instrument electrically connected to said cell, adjustable compensating means for reducing the response current of said cell proportional to the brightness of a photographic object to a predetermined value, cooperating stop means associated with both said iris diaphragm adjusting means and said compensating means to limit the adjustment of said diaphragm from its starting position, means to vary the initial position of one of said stop means in accordance with varying emulsion speeds, an exposure time control means for said camera, further means coupled with said control means to vary the initial position of the other stop means, shutter release means for said camera, and yieldable coupling means between said shutter release means and said iris diaphragm adjusting means to operate said diaphragm to a position determined by said compensating means in the compensating position prior to effecting an exposure.

10. In combination with a photographic camera having iris diaphragm adjusting means normally urged to a starting limit position, a photoelectric cell, a current indicating instrument electrically connected to said cell and having a pointer and cooperating fixed index mark, an adjustable compensating resistance connected in series with said cell and indicating instrument for reducing the response current of said cell proportional to the brightness of a photographic object to a predetermined value determined by said index mark, cooperating stop means associated with both said iris diaphragm and said compensating resistance to limit the adjustment of said iris diaphragm from its starting position in accordance ith the object brightness, means to vary the initial position of one of said stop means in accordance with varying emulsion speeds, shutter release means for said camera, and yielding coupling means between said shutter release means and said iris diaphragm adjusting means to operate said diaphragm to a position determined by said resistance in the compensating position.

11. In combination with a photographic camera having iris diaphragm adjusting means normally urged to a starting limit position, a photovoltaic cell, a current indicating instrument electrically connected to said cell and having a pointer cooperating with a fixed index mark, an adjustable compensating resistance connected in series with said cell and indicating instrument for reducing the response current of said cell proportional to the brightness of a photographic object to a predetermined value determined by said index mark, cooperating stop means associated with both said iris diaphragm and said compensating resistance to limit the adjustment of said irish diaphragm from its starting position in accordance with the object brightness, means to vary the initial position of one of said stop means in accordance with varying emulsion speeds, exposure time control means for said camera, further means coupled with said control means to vary the initial position of the other stop means, shutter release means for said camera, and yielding coupling means between said shutter release means and said diaphragm adjusting means to operate said diaphragm to a position determined by said resistance in the compensating position.

12. In exposure control apparatus for a photographic camera comprising shutter release means and adjustable exposure control means normally urged to a starting limit position, a photoelectric cell, current indicating means electrically connected to said cell, adjustable compensating means independent of said control means for reducing the response current of said cell to a predetermined value, abutment means independent of said current indicating means and in positive connection with said compensating means, yielding coupling means between said release means and said exposure control means to operate said exposure control means to a position determined by the position of said abutment means prior to effecting an exposure, and means to vary the predetermined value of the photoelectric response current in accordance with at least one further exposure controlling factor.

13. In exposure control apparatus for a photographic camera comprising shutter release means and adjustable exposure control means normally urged to a starting limit position, a photoelectric cell, a current indicating instrument electrically connected to said cell and having a movable pointer and a dial provided with an index mark, adjustable compensating means for reducing the response current of said cell to cause said pointer to coincide with said index mark, abutment means in positive connection with said compensating means, yielding coupling means between said release means and said exposure control means to operate said exposure control means to a position determined by the position of said abutment means prior to effecting an exposure, and means for adjusting the initial position of said index relative to said pointer in accordance with at least one further exposure controlling factor.

14. In exposure control apparatus for a photographic camera comprising shutter release means and adjustable exposure control means normally urged to a starting limit position, a photoelectric cell, current indicating means electrically connected to said cell, adjustable light dimming means independent of said control means associated with said cell for reducing the response current of said cell to a predetermined value, stop means independent of said current indicating means in positive connection with said light dimming means, and yielding coupling means between said release means and said exposure control means to operate said exposure control means to a position determined by the position of said stop means prior to effecting an exposure.

15. In exposure control apparatus for a photographic camera having adjustable exposure control means normally urged to a starting limit position, photoelectric means, first stop means in positive connection with said exposure control means, further adjustable stop means operable to varying positions in accordance with the response current of said photoelectric means, proportional to the brightness of a photographic scene in the operative position of said photoelectric means, and arranged to cooperate with said first stop means to limit the adjustment of said exposure control means from its starting position, and means for varying the initial relative position between said first stop means and said control means in accordance with an additional exposure controlling factor.

16. In exposure control apparatus for a photographic camera comprising shutter release means and adjustable exposure control means normally urged to a starting limit position, a photoelectric cell, a current indicator electrically connected to said cell, an adjustable electrical resistance element connected in the circuit of said cell for reducing the response current of said cell to a predetermined value, stop means independent of said indicator and in positive connection with and adjustable with said resistance element, and yielding coupling means between said release means and said exposure control means to operate said exposure control means to a position determined by the position of said stop means prior to effecting an exposure.

KARL RATH.